United States Patent [19]
Klassen et al.

[11] 3,916,495
[45] Nov. 4, 1975

[54] METHOD AND MEANS FOR BALANCING A GAS TURBINE ENGINE

[75] Inventors: David Dubble Klassen, Reading; Donald Alan Brozenske, Peabody, both of Mass.

[73] Assignee: General Electric Company, Lynn, Mass.

[22] Filed: Feb. 25, 1974

[21] Appl. No.: 445,675

[52] U.S. Cl. ......... 29/156.4 R; 29/156.8 R; 29/426; 74/573; 416/144
[51] Int. Cl.[2] .................................... F01D 25/00
[58] Field of Search... 29/1, 23.5, 156.4 R, 156.8 R, 29/159 R, 159 A, 159.1, 406–407, 445, 464, 466–467, 526, 557, 559, 426; 74/573; 73/65–66, 455, 457–460, 468–470; 301/5 B, 5 BA; 60/338; 64/1 S, 1 V, 12; 416/144, 145, 215; 415/DIG. 3, 118, 119, 122; 51/169

[56] References Cited
UNITED STATES PATENTS

| | | | |
|---|---|---|---|
| 1,776,125 | 9/1930 | Linn | 74/573 |
| 2,798,383 | 7/1957 | VanCleave | 416/144 UX |
| 3,097,824 | 7/1963 | Bunger et al. | 416/144 UX |
| 3,304,053 | 2/1967 | Pagluica | 74/573 X |
| 3,736,811 | 6/1973 | Neary | 416/144 X |
| 3,761,205 | 9/1973 | Cronstedt | 415/DIG. 3 X |

*Primary Examiner*—C. W. Lanham
*Assistant Examiner*—Joseph A. Walkowski
*Attorney, Agent, or Firm*—James W. Johnson, Jr.; Derek P. Lawrence

[57] ABSTRACT

A method and means is provided for initially balancing a gas turbine engine and any replacement turbine therefor so that if the original turbine becomes damaged or inoperative, it may be readily removed and replaced without performing an additional balancing operation. The turbine is connected in overhung relation to the aft end of the engine rotor shaft so that it can be removed and replaced without disturbing a bearing or seal. Slight variations in the dimensions of different replacement turbines and rotor shafts which could potentially unbalance a rebuilt engine are accounted for during the initial balancing of the engine so as to make the turbine readily replaceable without subsequently rebalancing the engine.

3 Claims, 4 Drawing Figures

U.S. Patent  Nov. 4, 1975  3,916,495
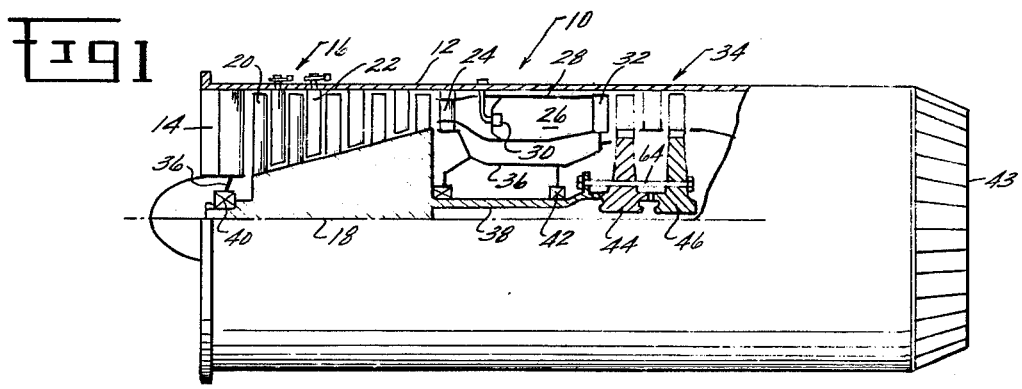
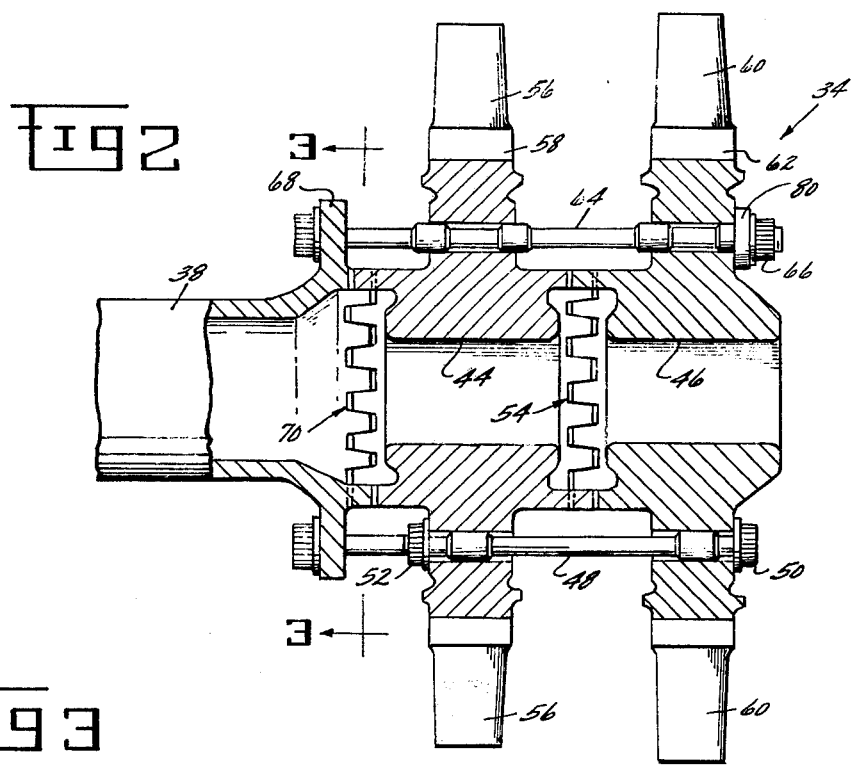
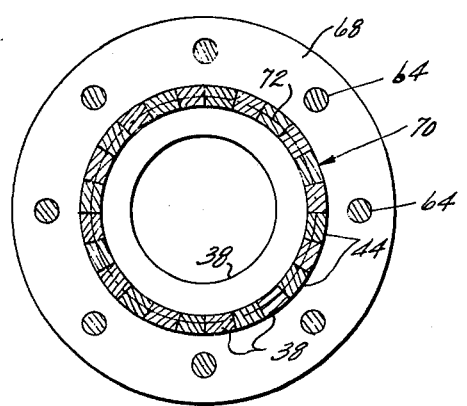
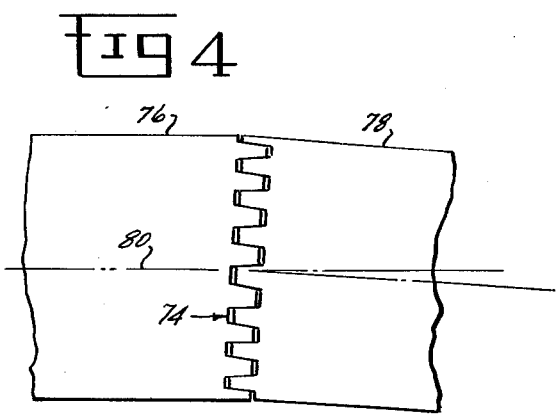

METHOD AND MEANS FOR BALANCING A GAS TURBINE ENGINE

BACKGROUND OF THE INVENTION

This invention relates to a method and means for balancing a gas turbine engine and, more particularly, to a method and means of initially balancing a gas turbine engine and replacement turbines therefor in order that the original turbine may be removed and replaced without performing additional balancing operations.

The invention herein described was made in the course of or under a contract or subcontract thereunder (or grant) with the Department of the Army.

Military aircraft, particularly aircraft having a vertical takeoff or landing (VTOL) capability, are often utilized in areas where conventional airfields are nonexistent, such as in combat zones and in other isolated areas. Under these and related conditions, the aircraft engines will be subject to increased risk from both enemy fire and the ingestion of substantial quantities of small foreign objects such as sand and dust particles. Therefore, the aircraft engines must be readily repairable in combat zones and other isolated areas away from airfields and service shops where manpower may be limited and where the only tools available may be those generally found in a hand tool box.

To this end, recent concepts for modularizing gas turbine engines have been developed as fully described in U.S. Pat. applications, Ser. Nos. 308,179 and 318,280, both of which are assigned to the instant assignee. These modularized gas turbine engines permit field replacement of major subassemblies such as turbines or combustors with only those tools which may be carried in an ordinary hand tool box. The turbine has been made readily maintainable by connecting it through a toothed coupling to the aft end of the engine rotor shaft which in turn is drivably connected to the engine compressor. In this manner the turbine overhands the aft end of the shaft and may be readily removed and replaced without disrupting a bearing or seal.

Unfortunately, difficulties have arisen due to the tolerances in the face and radial runout of the toothed coupling between the shaft and turbine which have made it heretofore impossible to remove and replace a turbine without performing a subsequent balancing operation. Such a balancing operation, however, involves the use of a balancing machine which would not ordinarily be available in the field.

Therefore, it is a primary object of this invention to provide a method of initially balancing a gas turbine engine and thereafter replacing the turbine without performing any additional balancing operations.

It is also an object of this invention to provide a method and means of initially balancing a gas turbine engine and any replacement turbine therefor at the factory in order that the original turbine may be readily removed and replaced in the field without performing an additional balancing operation.

SUMMARY OF THE INVENTION

These and other objects and advantages will be more clearly understood from the following detailed description and drawings, all of which are intended to be representative of, rather than in any way limiting on the scope of invention. A method is provided for initially balancing a gas turbine engine and thereafter replacing the turbine without performing any additional balancing operations. The method comprises the steps of first balancing a compressor and its connecting shaft for rotation with respect to a forward and aft bearing within the engine. Next the original turbine and any replacement turbine therefor is balanced on an arbor apart from the engine. After the original turbine is balanced, on the arbor, it is then connected to the shaft and additional balance weights are added to the turbine to correct for any unbalanced condition precipitated by the connection of the balanced turbine to the connecting shaft. If the original turbine should then become defective, it may be removed and replaced without performing a subsequent balancing operation so long as the additional balance weights are maintained in their original positions.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a side view, partly in cross-section, of a modularized gas turbine engine balanced in accordance with the method and means of this invention.

FIG. 2 is an enlarged cross-sectional view of the turbine of the modularized engine of FIG. 1.

FIG. 3 is a cross-sectional view taken along the line 3-3 of FIG. 2.

FIG. 4 is a side view of a portion of two typical shafts coupled together for rotation.

DESCRIPTION OF THE PREFERRED EMBODIMENT

Referring to FIG. 1, there is shown a gas turbine engine 10 having an outer casing 12 which is open at one end to provide an inlet 14 for the entrance of an ambient inlet airflow. The inlet airflow is compressed by a compressor 16 which may be either of the axial flow or centrifugal flow type. Compressor 16 includes a rotor 18 from which extend a number of axially spaced apart rows of rotor blades 20 interdigited between rows of axially spaced apart stator vanes 22 which may be of the variable type. Pressurized air may be discharged from the compressor 16 through a plurality of circumferentially spaced apart diffuser vanes 24 through which the compressed air is diffused prior to entering a combustion chamber 26.

Combustion chamber 26 is defined by a combustion liner assembly 28 and receives an inlet flow of fuel through a plurality of circumferentially spaced apart fuel nozzles 30. The high pressure air and fuel mixture is ignited to produce a high energy gas stream which exits from the combustion chamber 26 through a nozzle diaphragm assembly 32. High energy gas from the nozzle diaphragm assembly 32 then drives an overhung gas generator turbine 34 which connects to the compressor rotor 18 through a shaft 38.

It will thus be appreciated that the gas turbine engine 10 so far described could be utilized as a gas generator in combination with a power turbine [not shown] to form a turboshaft engine which may be connected to drive the rotor blades of a helicopter [also not shown]. It will also be appreciated that the gas turbine engine 10 may be utilized as a gas generator in a turbofan engine or turboprop engine.

The gas turbine engine 10 also includes a plurality of interconnected static frame members shown generally at 36 within which the rotor 18 and shaft 38 are journalled for rotation by a forward bearing housed within a sump 40 and an aft bearing housed within a sump 42. The gas turbine engine 10 may also include a variable exhaust nozzle 43 through which the high energy gas stream exits from the engine.

Referring now to FIG. 2, in conjunction with FIG. 1, the gas generator turbine 34 is shown in greater detail as including a forward rotor disc 44 spaced axially apart from an aft rotor disc 46. The forward and aft rotor discs 44, 46 are maintained in axially spaced abutting relation by a plurality of circumferentially spaced apart tie bolts 48, each of which has an integral bolt head 50 at one end thereof and is threadably engaged by a locknut 52 at the opposing end thereof. Torque is transmitted between the forward and aft rotor discs 44, 46 through a toothed coupling 54. Thus it should be appreciated that the elongated bolts 48 operate solely to maintain the rotor discs 44, 46 in axially engaging relation and do not operate to transfer torque between the rotor discs. Because torque is not transferred by the bolts 48, clearances between the bolts 48 and their respective holes in the rotor discs 44, 46 may be enlarged to permit easy insertion of the bolts therethrough.

The forward rotor disc 44 includes a plurality of circumferentially spaced apart airfoil type blades 56 disposed about the periphery thereof. Each airfoil type blade 56 includes an inner root portion 58 which may engage a dovetail slot in the periphery of the rotor disc 44 in a manner well known to the turbine art. In like manner, the aft rotor disc 46 also includes a plurality of circumferentially spaced apart airfoil type blades 60 disposed about the periphery thereof. Each blade 60 also includes a root portion 62 which may be engaged by a dovetail slot in the periphery of the rotor disc 46.

As is readily apparent, the gas generator turbine 34 overhangs the aft end of the shaft 38 and may be quickly connected thereto by a plurality of circumferentially spaced apart tie bolts 64 interspaced between the bolts 48 and threadably engaged at the aft ends by locknuts 66. The tie bolts 64 engage the shaft 38 through a radially extending circumferential flange 68 which is formed integral to the aft end of the shaft 38. Once again, the bolts 64 serve only to maintain the rotor discs 44, 46 and shaft 38 in spaced axially engaged relation with torque being transmitted through a toothed coupling 70. Because the bolts 64 also do not transmit torque, clearances between the bolts in their respective holes may be enlarged to permit easy insertion of the bolts therethrough.

During assembly of the gas turbine engine 10, the rotor 18 and its associated shaft 38 must be carefully balanced so that the center of inertia (center of mass) of the compressor and shaft coincide with the center axis of rotation. The rotor 18 and shaft 38 are both statically and dynamically balanced in a conventional manner which may be achieved in various ways, as, for example, by the addition of special weights designed to fit on the bolts or in grooves, or by grinding material from specified sections on the rotor 18. In order to facilitate the maintainability of the engine, as previously discussed, it is desirable that the gas generator turbine 34 be made readily removable and replaceable without the performance of additional balancing operations.

Although a replacement gas generator turbine may be both statically and dynamically balanced at the factory or service shop, difficulties still arise in the field when the replacement turbine is bolted to the aft end of the shaft 38. Such difficulties are precipitated by an unbalance introduced in the replacement gas generator turbine by the radial runout and face runout of the teeth at the aft end of the shaft 38.

Radial runout may be best understood by referring to FIG. 3 where the phantom line 72 represents the pitch line through the teeth of the toothed coupling 70. Ideally for a balanced rotor the geometric center of the pitch line 72 should coincide exactly with the center axis of rotation. However, such may not be the case due to present state of the art limitations in machining tolerances. The deviation of the geometric center of the pitch line 72 from the center axis of rotation is referred to as radial runout and introduces an unbalanced condition in the rotor which must be compensated for by a subsequent balancing operation. However, any balancing operation may be difficult, if not impossible, to perform in the field away from the factory or service shop.

Face runout may be best understood by referring to FIG. 4 where a balanced shaft 76 which is disposed for rotation about a center axis 80 connects to another shaft 78 through a toothed coupling 74. Ideally, the plane of the toothed coupling 74 should be exactly normal to the center axis of rotation 80, and any slight deviation therefrom as shown is commonly referred to as face runout and introduces an unbalance condition. The unbalance must be subsequently compensated for by an additional balancing operation which again may be impossible to perform in the field.

Referring back to FIG. 2, it becomes readily apparent that a replacement gas generator turbine 34 cannot be simply bolted to the aft end of the shaft 38 without incurring an unbalance condition precipitated by the radial and face runout at the toothed coupling 70. The method of this invention, however, provides a means whereby any radial or face runout of the toothed coupling 70 may be initially compensated for at the factory by the addition of a plurality of circumferentially spaced apart balance washers 80. The original turbine may then be removed and replaced with another factory balanced turbine without disrupting the overall rotor balance by simply replacing the balance washers 80 in their original locations.

During initial engine assembly, the method of this invention provides for the gas generator turbine 34 and any replacement turbine therefor to be initially balanced, both statically and dynamically, by attachment to an arbor closely resembling the aft end of the shaft 38. Each of the turbines is balanced in a conventional manner such as by the addition of weights designed to fit on bolts or in grooves or by grinding material from specified sections on the turbine. In this manner, any radial or face runout in the toothed coupling between the arbor and turbine will be balanced out. The turbine is then removed from the arbor and coupled to the aft end of the shaft 38 by the tie bolts 64, whereupon a new unbalanced condition will exist due to the change in the radial and face runout of the toothed coupling 70. Once again, the entire rotor must be rebalanced both statically and dynamically so as to compensate for differences between the radial and face runout of the toothed coupling 70. This balancing operation may be accomplished in a conventional manner by the addition of a plurality of circumferentially spaced apart balance washers 80 which are slipped over the ends of the tie bolts 64.

After the engine has been delivered from the factory for operation in the field, the gas generator turbine 34 may be removed and replaced by simply loosening the locknuts 66 and pulling the turbine in the aft direction so as to disengage the teeth of the coupling 70. As long as the replacement turbine has been balanced on an identical type of arbor as the original turbine, it may be installed on the engine without disrupting the overall rotor balance so long as the balance washers 80 are replaced in their original positions.

In this manner, a gas generator turbine of the overhung type may be readily removed and replaced without the necessity of performing additional balancing operations despite variations in the radial and face runouts at the toothed ends of the replacement turbines. The initial balancing of the original turbine and any replacement turbine therefor on the same type arbor at the factory compensates for any variation in radial and face runout between the toothed ends of the different replacement turbines. Maintaining the balance weights 80 in identical locations after the removal and replacement of a turbine compensates for any unbalance which may be introduced by the radial or face runout at the toothed end of the shaft 38. Also, as becomes readily apparent, any replacement turbine balanced at the factory may be interchanged with any engine turbine in the field. Thus, a special inventory of spare parts need not be maintained for each engine, resulting in a far simpler logistics support system.

Accordingly, while a preferred embodiment in a preferred application of the present invention has been depicted and described, it will be readily appreciated by those skilled in the art that many modifications, substitutions and changes may be made thereto without departing from the invention's fundamental theme. For example, a dummy turbine resembling a real turbine in weight and previously balanced on the identical arbor as the real turbine may be kept at the factory for connection to the aft end of the shaft 38 in a partially assembled engine. The entire rotor including the compressor 16 and shaft 38 together with the dummy turbine, may be balanced both dynamically and statically by the addition of balance washers 80 in the previously described manner. The dummy turbine may then be removed and replaced with a real turbine without further balancing so long as the balance weights 80 are maintained in their original positions. In this manner, production or servicing may proceed despite the fact that an actual turbine may not be immediately available, whereupon it becomes a simple matter to install the real turbine after its receipt without having to perform any additional balancing operations. Also, it should be readily appreciated that although a two stage turbine has been depicted and described, the actual scope of invention is by no means so limited and turbines having one or more stages may also be utilized. In addition although a toothed coupling 70 has been described, it would be equally satisfactory to use other types of couplings such as a flange joint or rabbet joint.

Therefore, having described preferred embodiments of the invention, what is desired to be secured by letters patent is as follows:

1. A method of initially balancing a gas turbine engine and thereafter replacing the turbine without performing any additional balancing operations comprises:

balancing a compressor and its connecting shaft for rotation with respect to a forward and aft bearing within the engine;

balancing the original turbine and any replacement turbine therefor for rotation with respect to the same or a substantially identical arbor apart from the engine;

connecting the original balanced turbine to the shaft;

correcting any unbalanced condition precipitated by the connection of the balanced original turbine to the connecting shaft by adding balance weight means to the original turbine, and removing and replacing the original turbine with the balanced replacement turbine while maintaining the positions of the balance weight means in the same relative positions on the replacement turbine as on the original turbine.

2. The method of claim 1 wherein:

the compressor and its connecting shaft are balanced in a conventional manner;

the original turbine and any replacement turbine therefor is connected to the arbor by a toothed coupling, and the original balanced turbine and any replacement turbine therefor is connected to the aft end of the shaft by a second toothed coupling substantially identical to the first toothed coupling wherein the additional balance weight means corrects for any unbalance due to radial and face runout at the second toothed coupling.

3. The method of claim 2 wherein:

the original balanced turbine and any replacement therefor is connected in spaced axially engaged relation with the shaft by a plurality of circumferentially spaced apart tie bolts interconnecting the turbine and shaft with torque transmitted from the turbine to the shaft through the second toothed coupling; and the additional balance weight means comprises washers slipped over the tie bolts so as to always retain their original positions despite the removal and replacement of a turbine.

* * * * *